(12) United States Patent
Suh et al.

(10) Patent No.: US 8,111,976 B2
(45) Date of Patent: Feb. 7, 2012

(54) METHOD OF DISPLAYING SUB-PICTURE IN DVD PLAYER

(75) Inventors: Jong Yeul Suh, Seoul (KR); Seung Joon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1729 days.

(21) Appl. No.: 10/894,038

(22) Filed: Jul. 20, 2004

(65) Prior Publication Data

US 2005/0019006 A1     Jan. 27, 2005

(30) Foreign Application Priority Data

Jul. 21, 2003     (KR) .................. 10-2003-0049754

(51) Int. Cl.
*H04N 5/783* (2006.01)

(52) U.S. Cl. ...................... 386/344; 386/343

(58) Field of Classification Search .......... None
See application file for complete search history.

(56) References Cited

U.S. PATENT DOCUMENTS

| 5,457,542 | A  | * | 10/1995 | Kim ........................... 386/7 |
| 6,028,539 | A  | * | 2/2000  | Matsui ....................... 341/55 |
| 6,801,709 | B1 | * | 10/2004 | Park .......................... 386/68 |
| 6,868,224 | B1 | * | 3/2005  | Birmingham et al. ...... 386/68 |
| 7,362,951 | B2 | * | 4/2008  | Kudou ....................... 386/68 |

FOREIGN PATENT DOCUMENTS

| JP | 2002-033993 A   | 1/2002  |
| JP | 2002-290894 A   | 10/2002 |
| JP | 2002-354395 A   | 12/2002 |
| KR | 10-2001-0001609 A | 1/2001 |

* cited by examiner

*Primary Examiner* — William C Vaughn, Jr.
*Assistant Examiner* — Heather Jones
(74) *Attorney, Agent, or Firm* — Birch, Stewart, Kolasch & Birch, LLP

(57) ABSTRACT

The present invention provides a method of displaying a sub-picture in a DVD player, by which the sub-picture is displayed in trick play mode to provide more information to a user. The present invention includes optionally decoding video data within a DVD according to a play speed of a trick play mode and displaying the decoded video data and selectively decoding at least one of a plurality of sub-picture data within the video data that is being decoded and displaying the decoded sub-picture data during a predetermined time.

14 Claims, 6 Drawing Sheets

METHOD OF DISPLAYING SUB-PICTURE IN DVD PLAYER

This application claims the benefit of the Korean Application No. P2003-49754 filed on July 21; 2003, which is hereby incorporated by reference.

BACKGROUND OF THE INVENTION

1. Field of the Invention

The present invention relates to a method of displaying a sub-picture in a DVD player, and more particularly, to a sub-picture displaying method in trick play mode.

2. Discussion of the Related Art

Generally, a DVD format named digital video disc or digital versatile disc was jointly developed by ten leading consumer companies. After a DVD player has been marketed in Japan, November in 1996, the analog VHS tape has been rapidly replaced by DVD to make a great change of out life patterns.

DVD supports audio stream change, sub-picture stream change, camera angle change, and the like as well as general playback and further supports trick play and random access such as fast-forward, fast-reverse, slow-forward, slow-reverse, pause-on, pause-off, still-off. DVD provides a chapter skip function of skipping to a next chapter or retrieving to a previous chapter as well. And, DVD is equipped with a user operation function associated with various buttons as well as a menu call function enabling to select such a menu as title, root, sub-picture, audio, angle, etc. Moreover, DVD enable to put limitation on playback of scenes or discs inappropriate for children via parental management information or the like.

The sub-picture designates a simple animation such as sub-title, menu, caption, karaoke, and simple animation. And, the sub-picture is constructed with background pixel, pattern pixel, emphasis pixel-1, and emphasis pixel-2, each of which is indicated by 2-bits run-length encoded bitmap, respectively. And, binary '00', '01', '10', and '11' are allocated to the background pixel, pattern pixel, emphasis pixel-1, and emphasis pixel-2, respectively. Each of the background pixel, pattern pixel, emphasis pixel-1, and emphasis pixel-2 can take one color from 16-colors palette as well as one contrast value among sixteen contrast values designating general transparency values from 'full transparency' to 'full opacity'. A data rate of the sub-picture is maximum 3.36 Mbps per stream, and a maximum size of a sub-picture unit is 53,220 bytes. The sub-picture is mostly displayed via OSD and plays a role in providing information of DVD contents in the form of characters to a user. Hence, the sub-picture is an important means for visually providing information to a user together with video.

Meanwhile, a fast-forward function of the DVD player, which provides a user with a method of enabling to play back the DVD contents at high speed, is generally used by a user as a means for searching a relatively vast amount of data within a short period of time or shifting to a specific scene. Yet, it is difficult for a user to accurately acquire the information for a corresponding section from the corresponding image moving so fast. So, the user frequently needs to repeatedly perform the fast-forward function or normal playback on the same section.

Accordingly, in performing the fast-forward function of the DVD player such as a trick play mode, a user needs to be provided with a means for providing information as well as video to give more information during a short period of time.

However, in performing the fast-forward function, the related art DVD player provides video data only but fails to perform decoding on audio or sub-picture. Specifically, in case of the sub-picture, if the fast-forward function is activated, the decoding of the sub-picture is forcibly stopped. In such a case, a user has to recognize the information of a specific section with the fast-moving images only. Hence, the user has difficulty in acquiring the accurate information of the specific section or may have to repeatedly perform the fast-forward function or normal playback on the same section.

SUMMARY OF THE INVENTION

Accordingly, the present invention is directed to a method of displaying a sub-picture in a DVD player that substantially obviates one or more problems due to limitations and disadvantages of the related art.

An object of the present invention is to provide a method of displaying a sub-picture in a DVD player, by which the sub-picture is displayed in trick play mode to provide more information to a user.

The present invention is characterized in that, in performing DVD playback in trick play mode, a value corresponding to a playback period of each sub-picture is parsed to display the sub-picture based on the parsed value.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of displaying a sub-picture in a DVD player according to the present invention includes the steps of optionally decoding video data within a DVD according to a play speed of a trick play mode and displaying the decoded video data and selectively decoding at least one of a plurality of sub-picture data within the video data that is being decoded and displaying the decoded sub-picture data during a predetermined time.

In this case, the video data within the DVD may be VOBU (video object unit).

And, the decoded sub-picture data may be a first sub-picture data of a plurality of the sub-picture data within the video data that is being decoded.

Moreover, other sub-picture data are not decoded but skipped while the decoded sub-picture data is displayed. And, another sub-picture data can be decoded after the predetermined time of displaying the decoded sub-picture data passes.

And, a display-on time point of the decoded sub-picture data depends on a first PTS (presentation time stamp) of the video data that is being decoded. Moreover, a display-off time point of the decoded sub-picture data depends on a value found by adding a start time of a corresponding sub-picture display control sequence to a first PTS (presentation time stamp) of the video data that is being decoded.

In another aspect of the present invention, a method of displaying a sub-picture in a DVD player includes the steps of optionally decoding a video pack within a VOBU (video object unit) of a DVD according to a play speed of a trick play mode and displaying the decoded video pack, selecting a sub-picture pack to be decoded from a plurality of sub-picture packs within the VOBU, and decoding the selected sub-picture pack and displaying the decoded sub-picture pack during a predetermined time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention is characterized in that, in case of playing back DVD using a trick play mode performing a fast-forward function, a predetermined amount of sub-picture is provided to enable a user to acquire more information from a trick play section.

Figure 1:
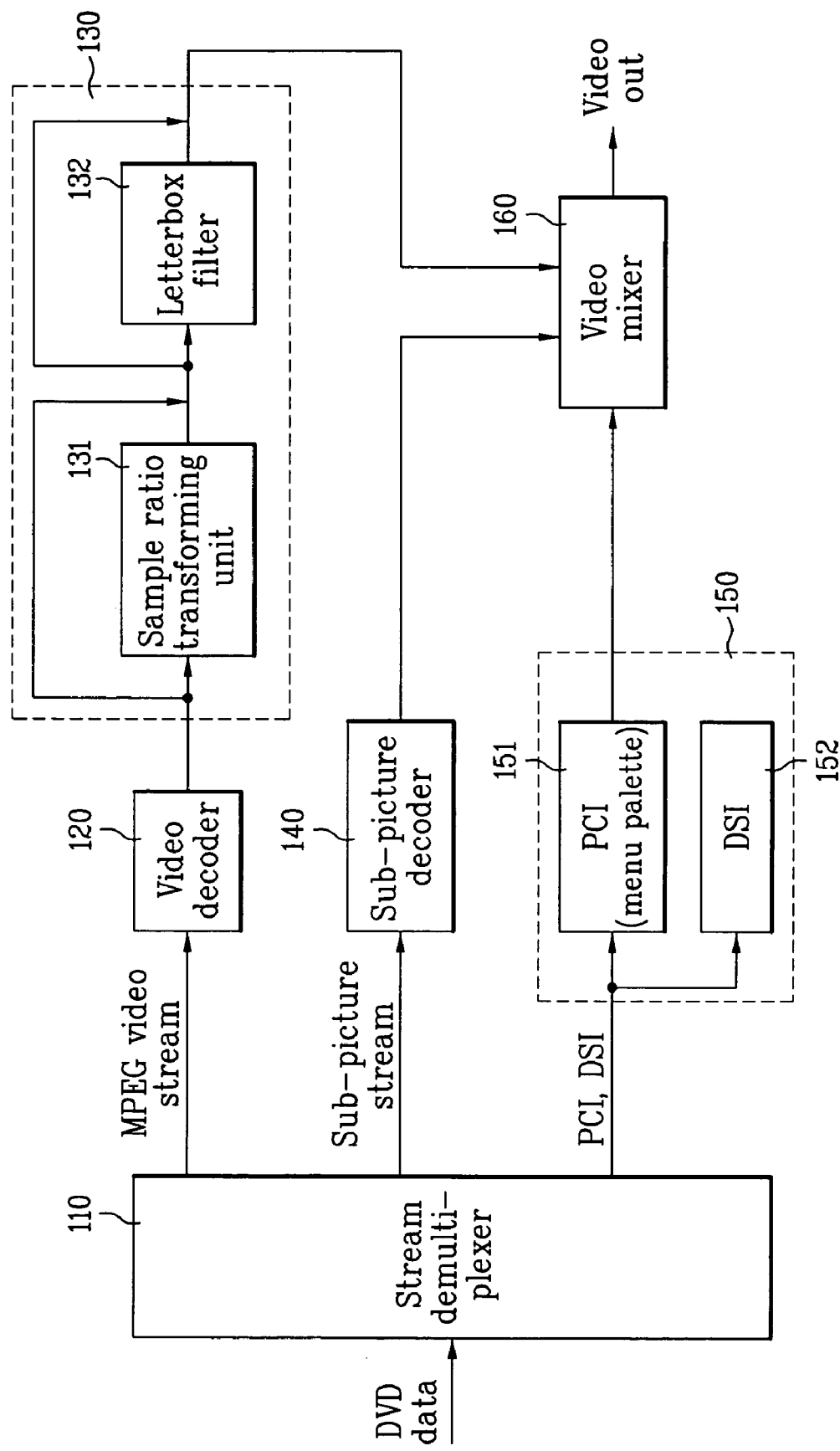
FIG. 1 is a block diagram of a DVD player for displaying a sub-picture in trick play mode.

FIG. 1 is a block diagram of a DVD player for displaying a sub-picture in trick play mode, in which a video signal processing block is shown only.

Referring to FIG. 1, a DVD player for displaying a sub-picture includes a stream demultiplexer 110 separating a video stream, sub-picture stream, and navigation stream from DVD data read out of a disc, a video decoder 120 decoding the separated video stream, a size transforming unit 130 transforming a size of the video-decoded data to fit a display device, a sub-picture decoder 140 decoding the separated sub-picture stream, a navigation data processor 150 processing the separated navigation data, and a mixer 160 mixing to output the decoded/size-transformed video data and the sub-picture data.

And, program stream (PS) type presentation data and navigation data are recorded in DVD.

The presentation data include audio and video data to be a playback target and sub-picture data such as a caption video and the like.

Hence, the stream demultiplexer 110 separates the video stream, audio stream, and sub-picture stream from the PS type DVD presentation data that is inputted by being read from the disc, and also separates PCI (presentation control information) and DSI (data search information) from the navigation data.

The video stream is decoded in the video decoder 120 according to MPEG video decoding algorithm and is then outputted to the size transforming unit 130. The size transforming unit 130 transforms a letterbox and aspect ratio of the video signal according to a video setup item of the DVD player and then displays it on a screen via the mixer 160.

The sub-picture stream is sub-picture-decoded in the sub-picture decoder 140 and is then displayed on the screen via OSD (on-screen display) processing.

The PCI and DSI are outputted from a PCI unit 151 and DSI unit 152 of the navigation data processor 150, respectively. In doing so, palette information, highlight information, and the like for displaying the sub-picture are controlled by the PCI unit 151 of the navigation data processor 150. And, the DSI unit 152 of the navigation data processor 150 provides the information associated with acquisition of the disc data during trick play implementation. Namely, the navigation data processor 150 controls an overall flow of DVD playback based on the DSI and PCI data.

Figure 2:
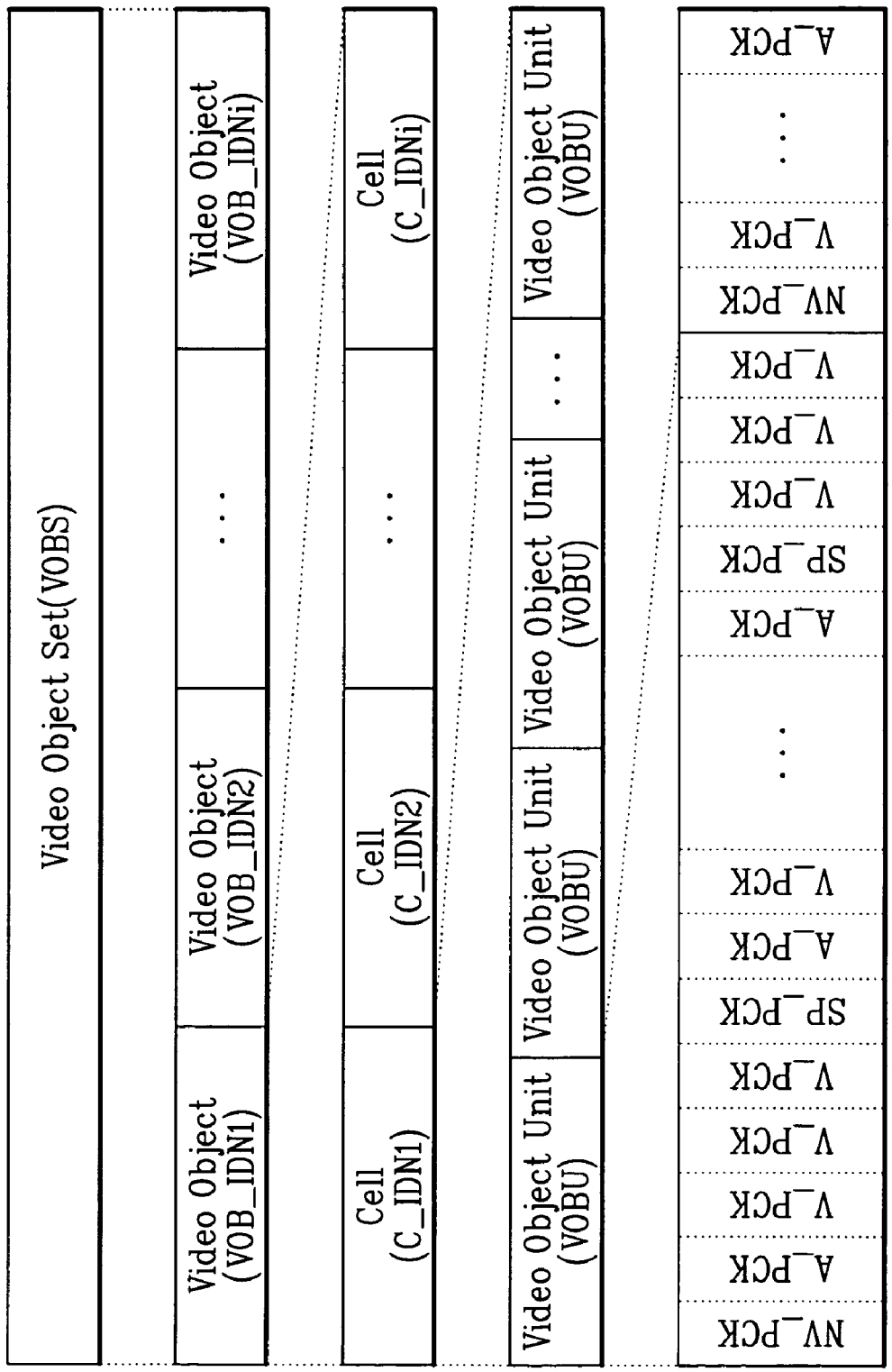
FIG. 2 is a structural diagram of VOBS (video object set)

FIG. 2 is a structural diagram of VOBS (video object set).

Referring to FIG. 2, VOBS (video object set) consists of a plurality of VOBs (video objects). And, each VOB is configured with video data, audio data, sub-picture data, PCI data, and DSI data. There mainly exist three VOBS types such as VMGM_VOBS for a menu in VMG (video manager), VTSM_VOBS for a menu in VTS (video title set), and VTSTT_VOBS allocated for a title of the VTS, and the like.

If we substantially look into DVD video files using the Windows explorer after inserting a DVD title in a PC DVD ROM drive, the three VOBS types are clearly identified from each other. For instance, files corresponding to VMGM_VOBS, VTSM_VOBS, and VTSTT_VOBS are VIDEO_TS.VOB, VTS_01_0.VOB, and VTS_01_1.VOB, respectively.

The VOB (video object) includes a plurality of cells. Each of the cells includes a plurality of video object units (VOBUs). And, each VOBU includes a navigation pack, audio pack, video pack, and sub-picture pack.

Figure 3A:
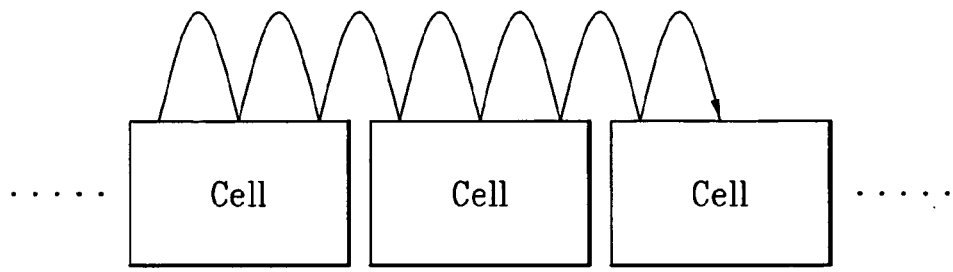
FIG. 3A is a diagram of a concept of physical playback location shift of video data according to low-speed play.
Figure 3B:
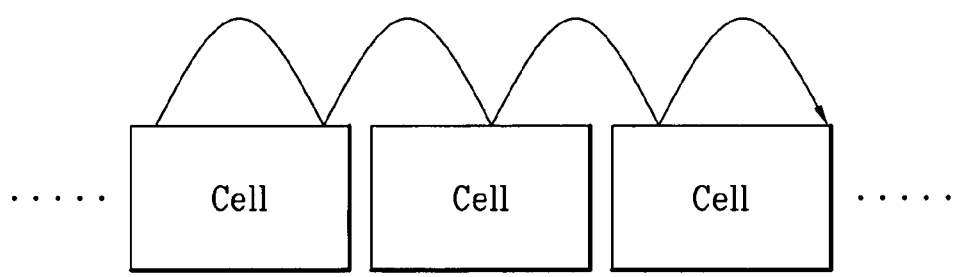
FIG. 3B is a diagram of a concept of physical playback location shift of video data according to high-speed play.

FIG. 3A is a diagram of a concept of physical playback location shift of video data according to low-speed play, and FIG. 3B is a diagram of a concept of physical playback location shift of video data according to high-speed play.

Once a user selects a fast-forward function for a trick play ode, a DVD player reads data in a manner of skipping over a predetermined interval of the data sequentially stored in a video data zone of a DVD. In doing so, the skipping interval is defined as 'step size' in the present invention and the step size has a different value according to a physical speed at which fast-forward is performed.

Comparing FIG. 3A and FIG. 3B, fast-forward in FIG. 3B is performed twice faster than that in FIG. 3A. In doing so, the video data is assortatively read according to an interval of the step size, and the video decoder 120 generally decodes the video data corresponding to Picture-I or Picture-P only for real-time decoding required for performing fast-forward.

Figure 4:
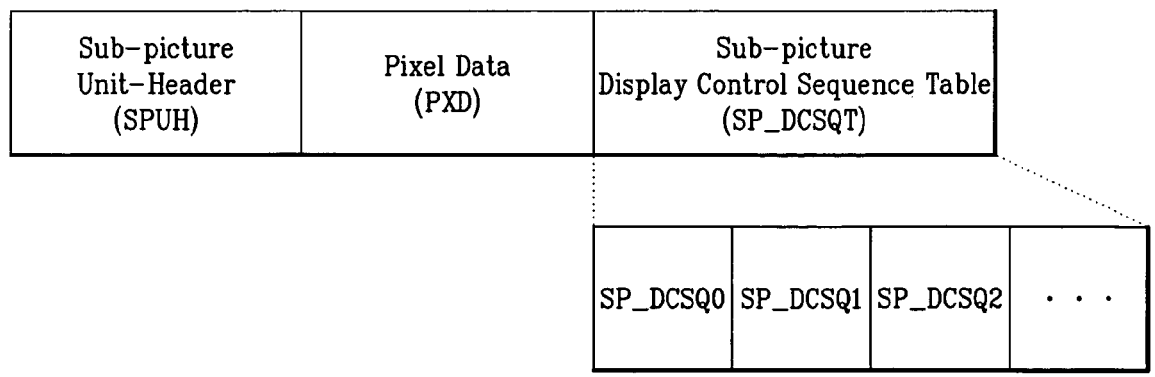
FIG. 4 is a structural diagram of a sub-picture unit.

FIG. 4 is a structural diagram of a sub-picture unit.

Referring to FIG. 4, a unit configuring a caption chapter 1 in a DVD video subtitle is called SPU (sub-picture unit), and the SPU includes a plurality of ES (elementary stream) data. The sub-picture unit (SPU), as shown in FIG. 4, includes a sub-picture unit header (SPUH), pixel data (PXD), and a sub-picture display control sequence table (SP_DCSQT). Each of The pixel data and sub-picture display control sequence table may have maximum 26,610 bytes. The sub-picture header includes 2-bytes indicating a sub-picture unit size and another 2-bytes indicating a start address of the display sequence table.

The pixel data is a run-length encoded bitmap data and 2-bits are allocated to each pixel. There are four kinds of pixel data such as a background pixel, pattern pixel, emphasis pixel-1, and emphasis pixel-2, and binary numbers '00', '01', '10', and '11' are allocated to the background pixel, pattern pixel, emphasis pixel-1, and emphasis pixel-2, respectively. Each of the background pixel, pattern pixel, emphasis pixel-1, and emphasis pixel-2 has a color pixel depth of 4 bpp (bits per pixel). Namely, it means that a color value of 4-bits is allocated per one pixel and one value can be taken from 16-colors palette. Moreover, each pixel can have a 16-level contrast. 'Contrast' means a general transparency values from '0' of full transparency to '15' of full-opacity.

The sub-picture display control sequence table SP_DCSQT includes (n+1) sub-picture display control sequences SP_DCSQ#0~SP_DCSQ#n. Each of the sub-picture display control sequences includes a 2-bytes SP_DCSQ_STM indicating a start time of the sub-picture display control sequence, a 2-bytes SP_NXT_DCSQ_SA indicating a start address of a next sub-picture display control sequence, and n display control commands SP_DCCMD#1~SP_DCCMD#n.

Each of the display control commands SP_DCCMD is a command language set for controlling a display of sub-picture and includes nine kinds of elements. The nine kinds of the elements are 1-byte FSTA_DSP (forcedly set display start timing of pixel data) forcedly starting a display of pixel data regardless of on/off states of a display of sub-picture, 1-byte STA_DSP (sets display start timing of pixel data) as a command for starting a display of sub-picture, 1-byte STP_DSP (sets display stop timing of pixel data) as a command for stopping a display of sub-picture, 3-bytes SET_COLOR (sets color code of pixel data) giving a color code to a pixel, 3-bytes SET_CONTR (sets contrast between pixel data and main picture) for adjusting contrast between pixel data and main picture, 7-bytes SET_DAREA (sets display area of pixel data) for setting a display area of pixel data, 5-bytes SET_DSPXA (sets display start address of pixel data) for setting an address of a first pixel data used for display, CHG_COLCON (sets change of color and contrast for pixel data) as a command for changing color and contrast of a pixel when a video frame is changed, and CMD_END (end of display control command) informing an end of a display control command.

A timing point of displaying a sub-title in a general DVD video can be found in a following manner. First of all, after PS (program stream) has been decoded into PES (packetized elementary stream) level via the sub-picture decoder 140, a packet header portion is decoded to find PTS (presentation time stamp) value. The start time SP_DCSQ_STM#0 of the sub-picture display control sequence found from the sub-picture display sequence SP_DCSQ#0 is added to the PTS value to result in the display timing point.

A timing point of turning off the display of the sub-picture is found by adding SP_DCSQ_STM#1 value decoded in the next sub-picture display sequence SP_DCSQ#1 to the PTS value.

The timing point of turning on/off a sub-title generally corresponds to (PTS+SP_DCSQ_STM#m, where m is an integer between 0~n). Yet, the PTS value is enough to recognize the time point of turning on the sub-title since the SP_DCSQ_STM value of turning on a sub-title is always '0' in a general DVD movie.

Figure 5A:
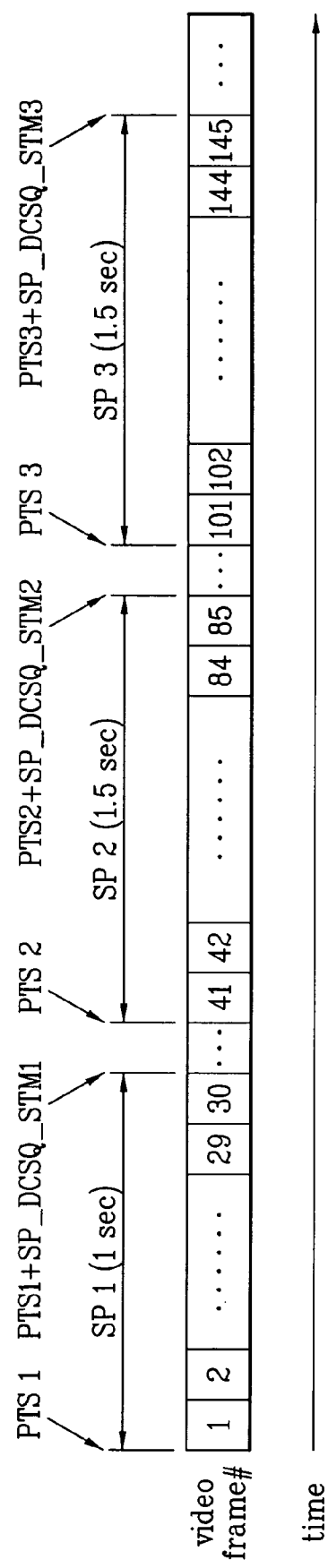
FIG. 5A is a diagram of a timing relation between a displayed video frame and sub-picture in normal play mode.
Figure 5B:
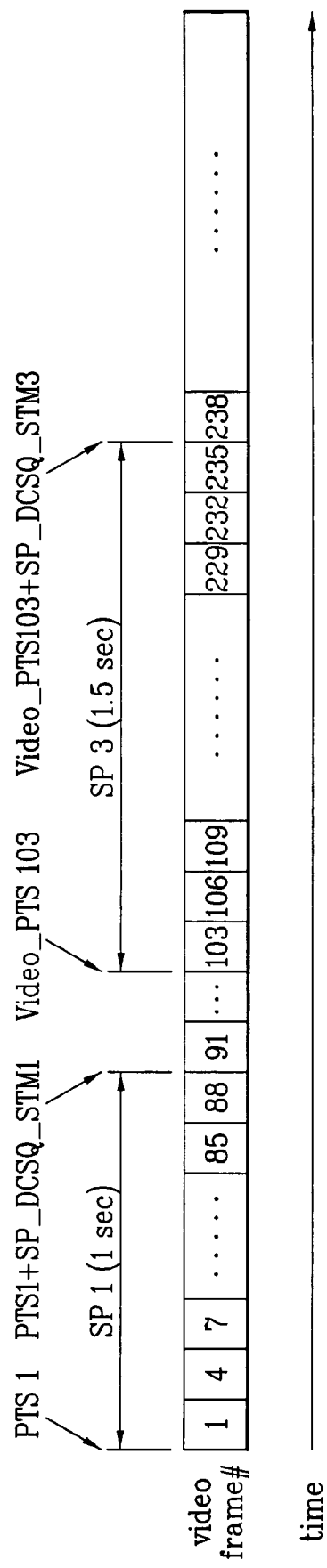
FIG. 5B is a diagram of a timing relation between a displayed video frame and sub-picture in trick play mode.

FIG. 5A is a diagram of a timing relation between a displayed video frame and sub-picture in normal play mode, and FIG. 5B is a diagram of a timing relation between a displayed video frame and sub-picture in trick play mode.

Referring to FIG. 5A and FIG. 5B, it is assumed that display times of sub-pictures SP1 to SP3 are 1.0 sec, 1.5 sec, and 1.5 sec, respectively. If a trick play is performed at 3× speed from a first video frame, the first sub-picture SP1 is displayed during 1.0 sec corresponding to the previously set display time. In this case, '1.0 sec' is a value designated by SP_DCSQ_STM1 of the SP1. And, the first to eighty-eights video frames are played back by the 3× speed trick play.

In doing so, a player decodes video packs within VOBU of DVD with a step size three times greater than that of a normal play and does not perform decoding on other sub-pictures (i.e., SP2) of the VOBU inputted during 1.0 sec while the sub-picture pack SP1 is displayed on a screen. Namely, the video pack is collectively skipped according to a play speed of the play trick mode, whereas the sub-picture pack is skipped only during displaying the sub-picture. Hence, the screen display for the SP1 is stopped right after the 88$^{th}$ frame is displayed, and the sub-picture decoder 140 receives the sub-picture (i.e., SP3) of VOBU that is inputted later to perform decoding thereon. The sub-picture pack is actually included in the VOBU including a video pack corresponding to 101$^{st}$ frame, and the sub-picture pack SP3 lying between 100$^{th}$ and 103$^{rd}$ frames is decoded in the course of the 3× speed trick play. Hence, the sub-picture pack SP3 coincides with 101$^{st}$ frame in the course of the normal play but fails to coincide with the 101$^{st}$ frame in the course of the 3× speed trick play, thereby being displayed when the 103$^{rd}$ frame is displayed.

Namely, the sub-picture pack SP3 is displayed to correspond to PTS of the 103$^{rd}$ video frame, and the time point of 'display-off' is found by adding the value of SP_DCSQ_STM3 of the third sub-picture SP3 to the PTS value of the 103$^{rd}$ video frame.

In the present invention, video data within DVD are optionally decoded according to a playback speed of the trick play mode and the decoded video data are then displayed.

Subsequently, at least one of the sub-picture data within the video data that are being decoded is optionally decoded and the decoded sub-picture data is then displayed during a predetermined time.

In doing so, the decoded sub-picture data is a first sub-picture data of the sub-picture data within the video data that are being decoded.

And, while the decoded sub-picture data is displayed, other sub-picture data is not decoded but skipped. After the display time of the decoded sub-picture data passes, another sub-picture data is decoded.

In doing so, another sub-picture data is the one next to the displayed sub-picture data.

Moreover, the time point of 'display-on' of the decoded sub-picture data is decided from the first PTS (presentation time stamp) value of the video data that is being decoded, and the time point of 'display-off' of the decoded sub-picture data is decided by a value resulting from adding a start time of the corresponding sub-picture display control sequence to the first PTS of the video data that is being decoded.

Figure 6:
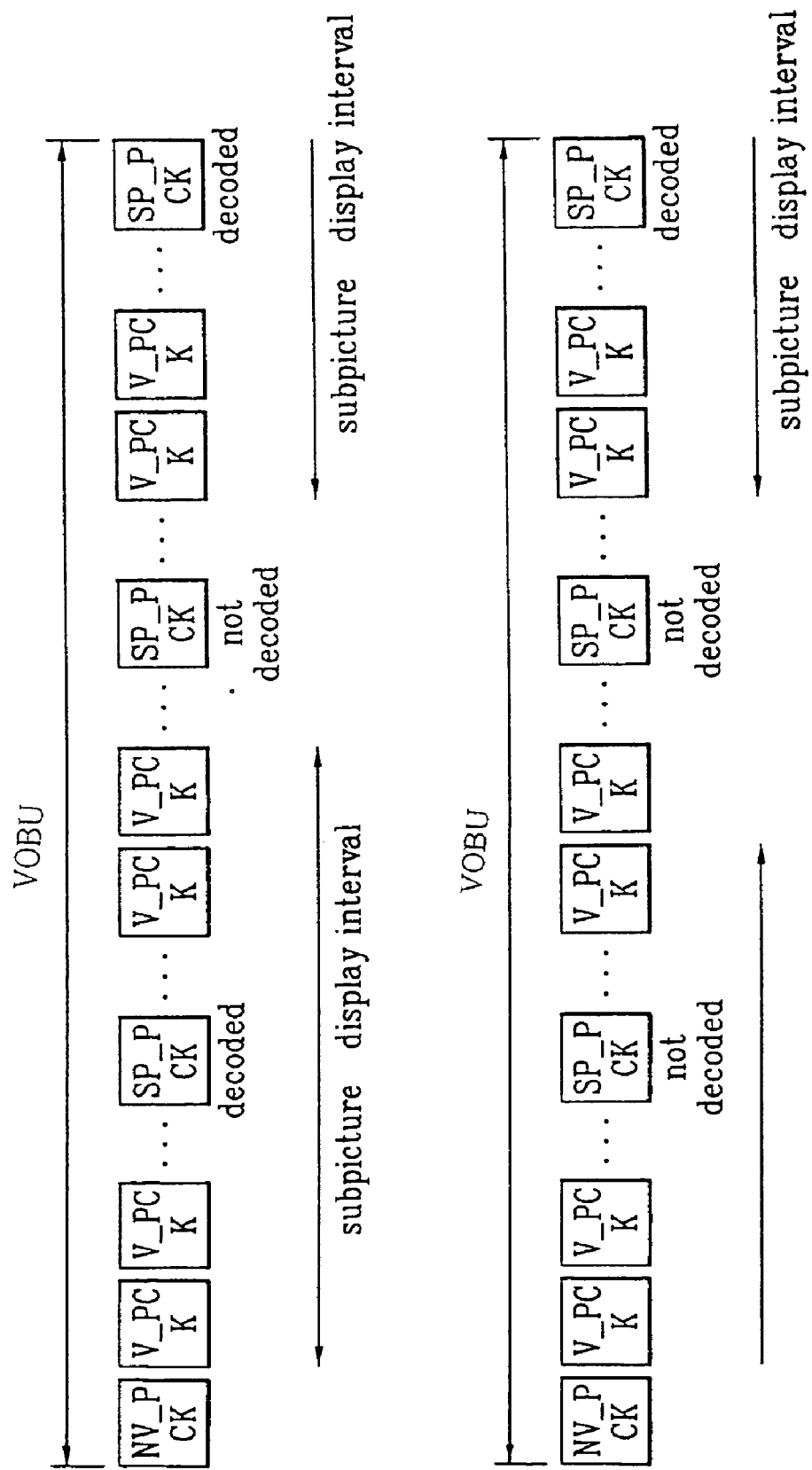
FIG. 6 is a conceptional diagram of a method of processing a video pack and sub-picture packet in trick play mode using a sub-picture display method according to the present invention.

FIG. 6 is a conceptional diagram of a method of processing a video pack and sub-picture packet in trick play mode using a sub-picture display method according to the present invention.

One VOBU should include one navigation pack as well as a series of video and audio packs. Moreover, the VOBU includes sub-picture packs to leave an appropriate interval from each other according to a display condition of caption information.

FIG. 6 shows a pack on which video data decoding will be performed, in which audio pack is omitted.

Referring to FIG. 6, decoding is performed on the video pack indicated by a block but is not performed on the video pack indicated by dots in trick play mode. Hence, in trick play mode, a player selects to decode the video pack including the video data of the frame that is being displayed. After having decoded the sub-picture pack including the corresponding caption information, the player displays a caption during a predetermined time. In doing so, another sub-picture pack inputted during the display time of the corresponding sub-picture is not decoded but skipped. Hence, the second sub-picture pack, as shown in FIG. 6, is not decoded. By the same method, a specific video pack is optionally decoded according to a playback speed of the trick play mode, and the corresponding sub-picture pack is optionally decoded to be displayed during a predetermined time.

Accordingly, the present invention displays the appropriate caption information for a corresponding play section in performing the trick play by a DVD playback apparatus such as a DVD player, a digital TV/DVD combo, and the like, thereby enabling to provide a user with an effective DVD trick play function. Therefore, in trick play mode, the present invention enables to provide a user with more information of the section on which a trick play is performed.

Moreover, in trick play mode, the present invention displays the caption information to enable a user to search a specific section more quickly.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of reproducing a sub-picture in a reproducing apparatus for display thereof, comprising:
   decoding video data within a recording medium according to a play speed of a trick play mode of the reproducing apparatus via the reproducing apparatus and displaying the decoded video data; and
   selectively decoding at least one of a plurality of sub-picture data within the video data that is being decoded via the reproducing apparatus and displaying the decoded sub-picture data during a time displayed in a normal play mode,
   wherein a display-off time point of the decoded sub-picture data depends on a value found by adding a start time of a corresponding sub-picture display control sequence to a first PTS (presentation time stamp) of the video data that is being decoded,
   wherein, when next video data is displayed, sub-picture data within the next video data is skipped while the displayed sub-picture data is displayed, and a next sub-picture data to be decoded is selected based on the display-off time point and the play speed of the trick play mode,
   wherein the selected next sub-picture data is decoded and displayed based on the first PTS of video data that is being decoded after the display-off time point, when a STC (system time clock) is greater than a PTS of the decoded next sub-picture, and
   wherein the STC is not greater than the first PTS of video data that is being decoded after the display-off time point.

2. The method of claim 1, wherein the video data within the recording medium is VOBU (video object unit).

3. The method of claim 1, wherein the decoded sub-picture data is a first sub-picture data of a plurality of the sub-picture data within the video data that is being decoded.

4. The method of claim 1, wherein other sub-picture data are not decoded but skipped while the decoded sub-picture data is displayed.

5. The method of claim 1, wherein another sub-picture data is decoded after the time of displaying the decoded sub-picture data passes.

6. The method of claim 5, wherein the another sub-picture data is arranged next to the displayed sub-picture data.

7. The method of claim 1, wherein the start time of the corresponding sub-picture display control sequence is a value decoded in a next sub-picture display control sequence.

8. A method of reproducing a sub-picture in a reproducing apparatus for display thereof, the method comprising:
   decoding a video pack within a VOBU (video object unit) of a recording medium according to a play speed of a trick play mode of the reproducing apparatus via the reproducing apparatus and displaying the decoded video pack;
   selecting a sub-picture pack to be decoded from a plurality of sub-picture packs within the VOBU via reproducing apparatus; and
   decoding the selected sub-picture pack via the reproducing apparatus and displaying the decoded sub-picture pack during a time displayed in a normal play mode,
   wherein a display-off time point of the decoded sub-picture pack depends on a value found by adding a start time of a corresponding sub-picture display control sequence to a first PTS (presentation time stamp) of the video pack that is being decoded,
   wherein, when a video pack within a next VOBU is displayed, a sub-picture pack within the next VOBU is skipped while the displayed sub-picture pack is displayed, and a next sub-picture pack to be decoded is selected based on the display-off time point and the play speed of the trick play mode,
   wherein the selected next sub-picture data is decoded and displayed based on the first PTS of video data that is being decoded after the display-off time point, when a STC (system time clock) is greater than a PTS of the decoded next sub-picture, and
   wherein the STC is not greater than the first PTS of video data that is being decoded after the display-off time point.

9. The method of claim 8, wherein the selected sub-picture pack to be decoded is a first sub-picture pack showing up right next to the decoded video pack.

10. The method of claim 8, wherein a subsequently inputted sub-picture pack is not decoded but skipped while the selected sub-picture pack is displayed.

11. The method of claim 8, wherein if the time of displaying the selected sub-picture pack passes, a next sub-picture pack subsequently inputted is decoded.

12. The method of claim 8, wherein the start time of the corresponding sub-picture display control sequence is a value decoded in a next sub-picture display control sequence.

13. The method of claim 8, wherein the sub-picture pack includes caption information therein.

14. A data reproducing device, comprising:
   a stream demultiplexer configured to separate a video stream, sub-picture stream, and navigation stream from data read out of a disc;
   a video decoder configured to decode the separated video stream according to a play speed of a trick play mode;

a size transforming unit configured to transform a size of the video-decoded data to fit a display device;

a sub-picture decoder configured to selectively decode at least one of a plurality of sub-picture data within video data of the video stream;

a navigation data processor configured to process the separated navigation data; and a mixer configured mix and output the decoded/size-transformed video data and the sub-picture data, wherein a display-off time point of the decoded sub-picture data depends on a value found by adding a start time of a corresponding sub-picture display control sequence to a first PTS (presentation time stamp) of the video data that is being decoded, wherein, when next video data is displayed, sub-picture data within the next video data is skipped while the displayed sub-picture data is displayed, and a next sub-picture data to be decoded is selected based on the display-off time point and the play speed of the trick play mode, wherein the selected next sub-picture data is decoded and displayed based on the first PTS of video data that is being decoded after the display-off time point, when a STC (system time clock) is greater than a PTS of the decoded next sub-picture, and wherein the STC is not greater than the first PTS of video data that is being decoded after the display-off time point.

* * * * *